…

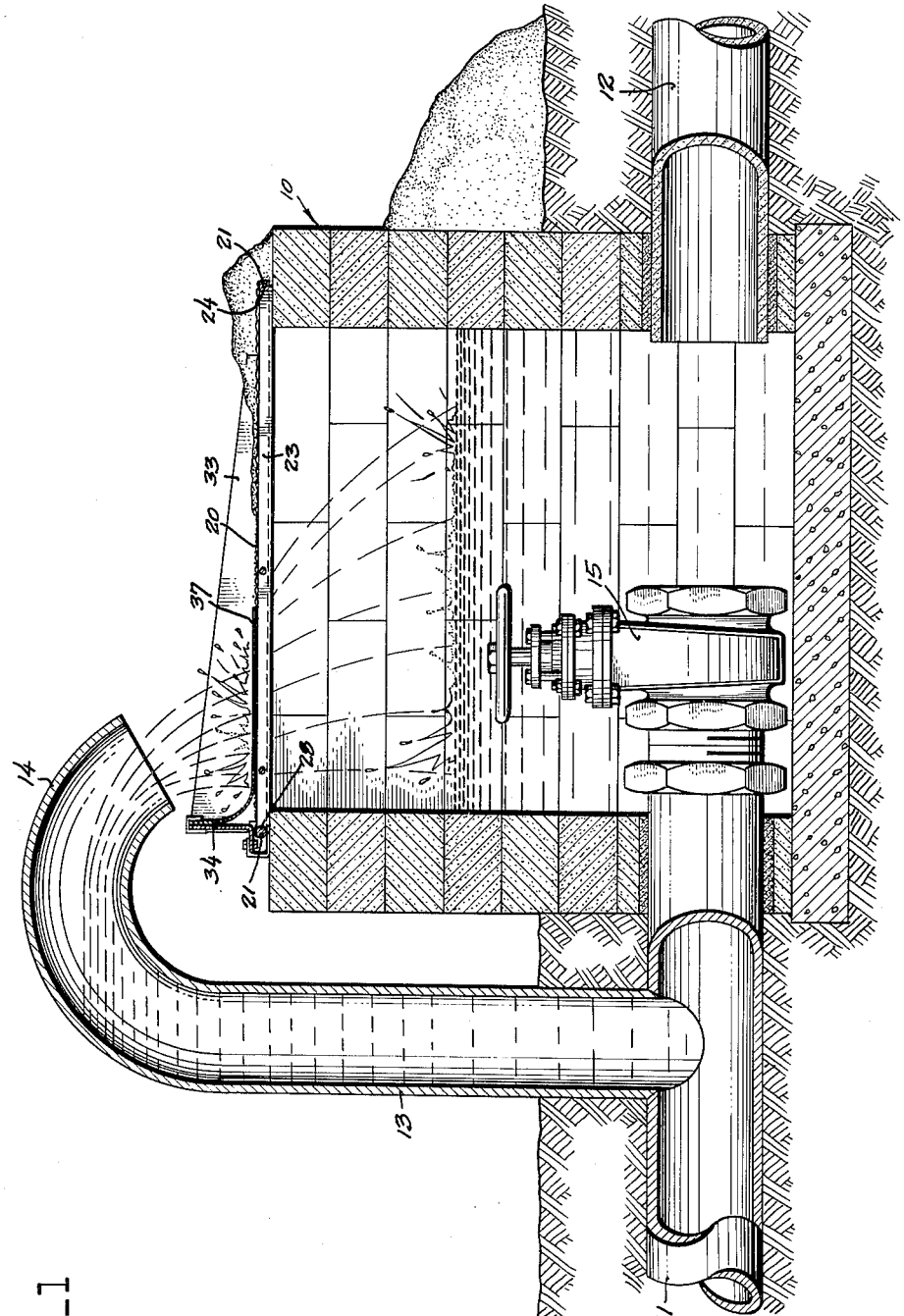

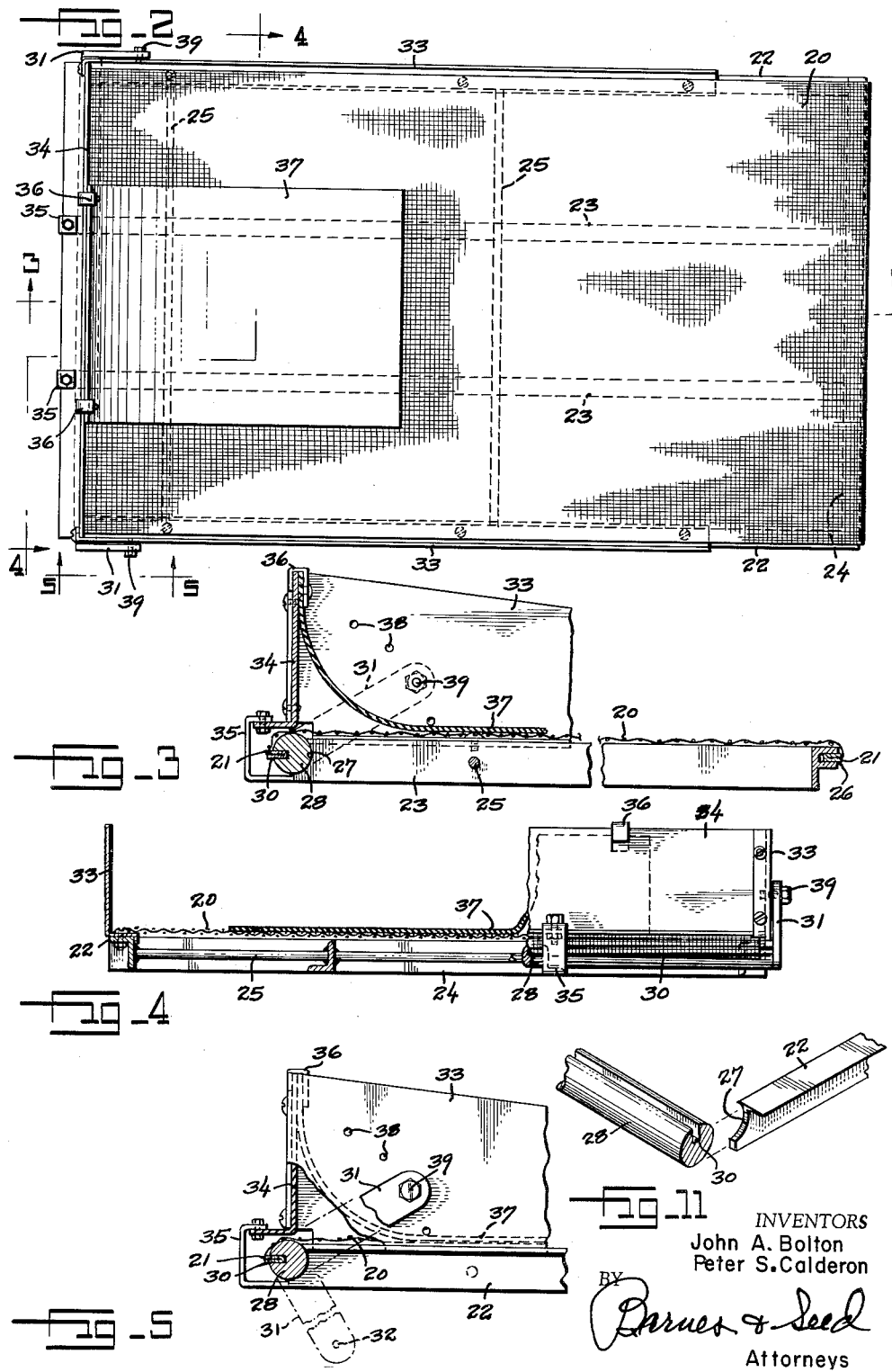

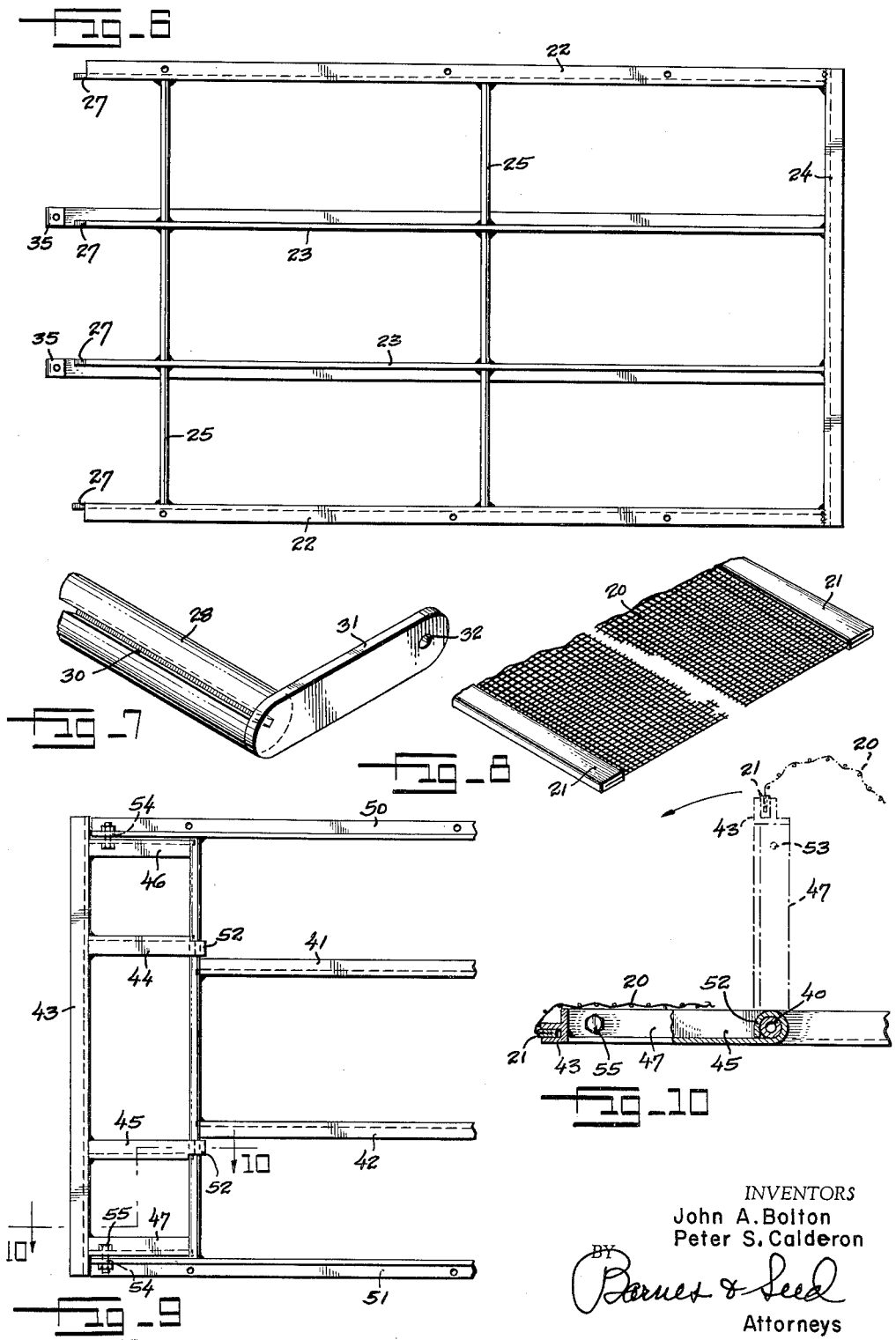

United States Patent Office 2,995,252
Patented Aug. 8, 1961

2,995,252
SCREENING OF IRRIGATION WATER
John A. Bolton and Peter S. Calderon, both of 712 S. 1st, Yakima, Wash., assignors of thirty-three and one-third percent to John Anderson, Yakima, Wash.
Filed July 1, 1957, Ser. No. 668,988
2 Claims. (Cl. 210—232)

This invention relates to improvements in screening boxes, and particularly screening boxes of the character illustrated and described in U.S. Pat. No. 2,745,554, issued May 15, 1956, wherein water for irrigation purposes is splashed from an overhead point of delivery onto a fine mesh screen. The filtered water which passes through the screen is caught in an underlying box and fed therefrom by gravity to a delivery manifold leading to a plurality of irrigation stand-pipes, each equipped with a delivery valve. It is for the purpose of removing from the water foreign matter such as silt, weed seed, moss and the like which might clog the delivery valves that the water is screened before entering the delivery manifold. The said foreign matter is caught on the surface of the screen and the continuing splash of the impacting water pushes this foreign matter, in what might be termed a "rolling" action, toward the edges of the screen, ultimately dropping over such edges onto the adjacent ground from where the same is removed at suitable intervals. That portion of the screen receiving the splash of the water is maintained substantially free of any of the silt, seed and other matter screened out of the water and the screen is thus protected against liability of becoming clogged. No attention to the screening box is necessary other than to remove the screenings at suitable intervals as they build up alongside the box.

One objection to the screening box shown and described in the above-identified patent has been the practical necessity for returning the screen-carrying frame to the factory, or to some other properly equipped agency, when a need arises for replacing the screen. This is due to the fact that the screen must be drawn tight if a proper "rolling" of the trapped foreign matter is to be obtained, and the screen-carrying frames, as heretofore designed, have required special equipment for tensioning the applied screen. The frequency of replacement has depended largely upon the nature of the foreign matter contained in the water which is being screened. Water which carries sand or other abrasive substance in any appreciable amount has been unusually hard on the screens.

It is one object of the present invention to provide a perfected screen-carrying frame enabling screens to be replaced and properly tensioned by the user, on the job, with no need for special equipment. It is a further and particular object to devise a frame which is of rugged construction and which provides maximum support for the screen with the least possible obstruction to the screening surface thereof.

As a yet further object the invention aims to provide a means applicable to a screening box of the character described effective to minimize the destructive action of water having sand or other abrasive matter carried thereby.

With the foregoing and other still more particular objects and advantages in view and which will each appear and be understood in the course of the following description and claims, the invention consists in the novel construction and in the adaptation and combination of parts hereinafter described and claimed.

In the accompanying drawings:

FIGURE 1 is a longitudinal vertical sectional view illustrating a screening box constructed to embody teachings of the present invention.

FIG. 2 is a fragmentary top plan view of the screen and its supporting frame, removed from the box proper, and drawn to an enlarged scale.

FIG. 3 is a fragmentary longitudinal vertical sectional view on line 3—3 of FIG. 2.

FIG. 4 is a fragmentary view partly in end elevation and partly in transverse vertical section on line 4—4 of FIG. 2.

FIG. 5 is a fragmentary large-scale side elevational view taken from the vantage point shown at 5—5 in FIG. 2.

FIG. 6 is a top plan view of the frame before applying the screen thereto, and with the tensioning bar removed.

FIG. 7 is a fragmentary large-scale perspective view of the tensioning bar.

FIG. 8 is a fragmentary perspective view of the screen, shown detached.

FIG. 9 is a fragmentary underside plan view of a modified frame, with the screen tensioned thereon.

FIG. 10 is a fragmentary longitudinal vertical sectional view drawn to an enlarged scale on line 10—10 of FIG. 9; and FIG. 11 is a fragmentary perspective view of the tensioning bar and a complementary stringer, with the bar in section.

The box proper of the present invention is comprised of an open-top receptacle of rectangular plan configuration walled along the bottom and the four sides and having the referred-to screen applied over the open top. The numeral 10 denotes said box.

Projecting into the interior of the box through two opposite side walls are a main supply pipe 11 and a delivery pipe 12, and leading upwardly from such main 11 is a branch 13 connecting with a goose-necked tail pipe 14 curving up and over the screen. The discharge mouth of this tail pipe is directed downwardly, preferably in such a position that a column of water issuing under pressure from the mouth strikes the screen fairly close to one end thereof. This said end of the screen will be hereinafter termed the head end, the other end being referred to as the tail end. On the outlet end of said main supply pipe 11 there is fitted a gate valve 15, such valve being normally closed. Pipes 11 and 12 desirably are co-axial and disposed in close proximity to the floor of the box.

Denoted by 20, the screen used in the present invention is fine mesh, 40 being suitable in most areas, and is desirably brass, having a rectangular plan configuration moderately larger than the top opening of the box. Each end of the screen is fixedly seized by a respective stiff edging 21 composed by preference of a folded strip of sheet metal machine-crimped over the screening cloth, producing that which in effect is a marginal tongue running the full width of the screen.

Proceeding now to a description of the frame for the screen, and first having reference to the preferred embodiment illustrated in FIGS. 2 through 7, the same is fabricated from a plurality, four being shown, of longitudinal stringers drawn from angle-iron stock and placed with a respective one of said stringers, designated by 22, at each side edge and with the other two stringers 23 located at equidistantly spaced intervals of the width. A cross-member 24, also of an angular form in section, connects said stringers at the tail end of the frame, and the same are also connected transversely at separated intervals of the length by struts 25 drawn by preference from rod stock spaced somewhat below the plane occupied by the top edge of the stringers. Two such rods are shown with one rod located at or about the mid-length of the frame and the other placed in spaced proximity to the head end. Considering the particular flange of each of said angle-iron members 22 and 23 which lies normal to the plane of the frame as being the vertical flange and the other flange as being the horizontal flange, it is to be noted that such vertical flange of each of the two inner stringers 23 is directed upwardly, or which is to say toward that face of the frame which lies uppermost when the frame is installed upon the box, whereas the vertical flange is directed downwardly in the instance of each of the side stringers. As here shown, the angle-iron cross-member 24 has its vertical flange directed downwardly.

The cross-member 24 is characterized in that its horizontal flange has a second augmenting flange welded or otherwise made an integral part of the member and disposed in such spaced parallelism to the major flange as to produce an outwardly directed groove 26 running the full width of the frame. This groove accommodates the tongue 21 at one end of the screen 20. Being formed as the mating complement thereof and having, say, a ⅛" width as compared with a ³⁄₃₂" thickness of the tongue, there is only so much tolerance as will permit the tongue to be introduced to and removed from the groove with relative freedom.

At the opposite or head end of the frame, each stringer has its vertical flange terminally notched to produce moderately concave re-entrant or saddle openings 27, and seated in these concave openings for pivotal adjustment about its own axis as a center is a bar 28 of circular cross-section. This bar, which has a width approximately the same as the frame, is provided with a radial groove 30 formed, like the groove 26, as the mating complement of a tongue 21 of the screen, and upon each of its two ends carries a respective crank arm 31 directed more or less diametrically opposite from the slot. Each crank arm is provided adjacent its free end with a drill-hole 32.

The screen-carrying frame is completed by splashboards arranged to extend along the head and each of the two sides. The two side-boards, designated by 33, are or may be composed of sheetmetal each stiffened by an inturned bottom flange which seats upon and is boltably secured to the horizontal flange of a related side stringer 22. The head board 34 interfits with said side board and is itself stiffened by an out-turned bottom flange, such flange being bolted to brackets 35 formed as arm prolongations of the horizontal flanges of the inner stringers 23. The head-board acts through clips or the like 36 to carry an imperforate apron 37, preferably of elastic rubber, this apron being of a size approximating the areal compass of the stream of water issuing from the tail pipe and being positioned upon the screen in direct underlying relation to said issuing stream so as to take the brunt of the main impact and largely relieve the screen from the wearing action of abrasive matter entrained in the water. This rubber apron obviates need for any open-mesh hardware cloth as a reinforcing medium below the screen.

In assembling the screen on the frame, the procedure is to first mount the side-boards upon the side stringers of the frame, then lay the screen in place, fitting the tongue at the tail end of the screen into the groove 26 of the cross-member 24. The next step is to set the bar 28 in the saddle notch turning the same so that the groove 30 is directed upwardly normal to the plane of the frame. The tongue at the head end of the frame is fitted in the groove. After applying the head-board, the bar is pivoted to tighten up the screen.

The length of the screen is such that a turn of approximately 90° or so in a counter-clockwise direction, considering the bar as being viewed from the left-hand end, is sufficient to place the screen in a taut condition. As the crank arms are turned the drill-holes 32 thereof are brought into successive register with a series of holes 38 provided in the side-board. Removable pins 39 are provided to engage in such registering holes for setting the bar. While we have here shown the bar as being applied to the head end of the frame, utilizing holes in the side-boards as a means of setting the bar in its adjusted position, it will be self-evident that such bar could as well be mounted at the tail end of the frame, with means being provided carried directly by the frame for fixing the bar in its adjusted positions.

In FIGS. 9 and 10 we have shown a modification which, however, is less advantageous from the fact that no provision is made for adjustment in the event that a minor take-up should be required. The splash-boards are deleted from these latter views in order to simplify the illustration.

In such modified arrangement a bar 40 drawn from pipe stock is substituted for the strut which lies in spaced proximity of an end of the frame, and the two inner stringers, here designated by 41 and 42, extend only to such bar 40. A secondary end frame is provided, employing a counterpart 43 of the cross-member 24 as a transverse terminal piece, and having four transversely spaced apart short lengths of angle iron welded to said member 43 as longitudinal members. Two of these said longitudinal members, designated by 44 and 45, are located in proximity of but spaced laterally beyond the stringers 41 and 42, while the other two members 46 and 47 lie inside and immediately adjacent the full-length side stringers 50 and 51. Each of such longitudinal members has the end thereof opposite the grooved cross-member 43 notched so as to saddle the bar 40, and at least two of such members, preferably the inner members 44 and 45, have the horizontal flange prolonged at the inner end with these prolongations being wrapped, as at 52, about the bar 40 to produce a swing journal. Holes 53 are provided in the vertical flanges of the members 46 and 47. When the end frame is swung into a position co-planar with the main frame, these holes are brought into register with holes 54 formed in the stringers 50 and 51 and accommodate removable locking pins 55. The act of swinging the end-frame into said co-planar position perforce tightens the screen upon the frame.

It is thought that the invention will have been clearly understood from the foregoing description of our illustrated embodiments. Changes in the details of construction will suggest themselves and it is accordingly our intention that no limitations be implied and that the hereto annexed claims be given the broadest interpretation to which the employed language admits.

What we claim is:

1. In a system for filtering irrigation water, a fine-mesh screen having a respective edging of relatively stiff material permanently fixed to each of the two ends to extend as a marginal tongue longitudinally thereof, a rigid skeleton frame for supporting said screen provided upon one of its two ends with a groove formed as the mating complement of the tongue of a related end of the screen and adapted to have said tongue lodged therein, the mouth of said groove facing away from the opposite end of the frame so that when the screen lays flat upon the frame and a pull force directed away from said lodged tongue is exerted upon the other tongue the said lodged tongue will be locked against dislodgment from the groove, means provided upon said other end of the frame adapted to engage said other tongue and functioning to perform said pull action in a manner which will tighten the screen upon the frame and releasably hold said tightened screen in its tightened condition, said frame-and-screen assembly serving as a closure for the open top of a box having a water-discharge opening in its side wall and occupying a position below a delivery pipe from which a stream of water having silt entrained therein is splashed onto the screen, the portion of screen which directly receives the output from said delivery pipe being substantially less than the full screening area, and an imperforate apron of elastic rubber lying directly upon said screen in a position covering said portion of the screen onto which the delivered water is directly supplied.

2. In a system for filtering irrigation water, a fine-mesh screen having a respective edging of relatively stiff material permanently fixed to each of the two ends to extend as a marginal tongue longitudinally thereof, a rigid skeleton frame for supporting said screen provided with means arranged and adapted to engage said edgings and exert a force thereon urging said edgings directively from one another so as to tighten the screen upon the frame and hold said screen in a taut condition, said frame-and-screen assembly serving as a closure for the open top of a box having a water-discharge opening in its side wall and occupying a position below a delivery pipe from which a stream of water having silt entrained therein is splashed onto the screen, the portion of screen which directly receives the output from said delivery pipe being substantially less than the full screening area, and an imperforate apron of elastic rubber lying directly upon said screen in a position covering said portion of the screen onto which the delivered water is directly supplied.

References Cited in the file of this patent

UNITED STATES PATENTS

| | | |
|---|---|---|
| 13,062 | Montgomery | June 12, 1855 |
| 380,323 | Hemingway | Apr. 3, 1888 |
| 812,405 | Carothers | Feb. 13, 1906 |
| 1,065,335 | Barton | June 24, 1913 |
| 1,206,468 | Robinson | Nov. 28, 1916 |
| 1,533,591 | Hall | Apr. 14, 1925 |
| 1,543,315 | Bland | June 23, 1925 |
| 1,886,173 | Flint | Nov. 1, 1932 |
| 2,267,327 | Ellen | Dec. 23, 1941 |
| 2,341,274 | Hoff | Feb. 8, 1944 |
| 2,745,554 | Bolton | May 15, 1956 |